United States Patent [19]

Yoon et al.

[11] Patent Number: 5,093,464
[45] Date of Patent: Mar. 3, 1992

[54] WHOLLY AROMATIC POLYAMIDE FROM N,N'-BIS (4-AMINO PHENYL)-ISOPHTHALAMIDE

[75] Inventors: Han-Sik Yoon; Wha S. Lee; Tae W. Son; Chul J. Lee; Byung G. Min, all of Seoul, Rep. of Korea

[73] Assignee: Korea Institute of Science and Technology, Seoul, Rep. of Korea

[21] Appl. No.: 441,465

[22] Filed: Nov. 27, 1989

[30] Foreign Application Priority Data

Dec. 1, 1988 [KR] Rep. of Korea ............... 16001/88[U]

[51] Int. Cl.$^5$ .............................................. C08G 69/32
[52] U.S. Cl. ............................... 528/329.1; 528/312; 528/315; 528/331
[58] Field of Search ................ 528/329.1, 331, 312, 528/315

[56] References Cited

U.S. PATENT DOCUMENTS

| | | | |
|---|---|---|---|
| 3,671,542 | 6/1972 | Kwolek | 260/78 |
| 3,869,429 | 3/1975 | Blades | 260/78 |
| 3,869,430 | 3/1975 | Blades | 260/78 |
| 4,511,709 | 4/1985 | Yoon et al. | 528/331 |

FOREIGN PATENT DOCUMENTS 2160878 1/1986 United Kingdom .

*Primary Examiner*—Harold D. Anderson
*Attorney, Agent, or Firm*—Oblon, Spivak, McClelland, Maier & Neustadt

[57] ABSTRACT

New wholly aromatic polyamides are provided. This polymers are prepared by a mixture of N,N'-bis(4-aminophenyl)-isophthalamide and p-phenylenediamine in a tertiary amide solvent containing an alkali metal salt such as LiCl and a tertiary amine as an acid acceptor. The polymers are easily dry-jet spun to form a fiber and cast to form a film. The fiber and film so obtained have ultrahigh tenacity, elasticity and elongation.

10 Claims, No Drawings

WHOLLY AROMATIC POLYAMIDE FROM N,N'-BIS (4-AMINO PHENYL)-ISOPHTHALAMIDE

BACKGROUND OF THE INVENTION 1. Field of the Invention

This invention relates to novel wholly aromatic copolyamides synthesized from N,N'-bis(4-aminophenyl)isophthalamide as a starting compound. More particularily, the invention relates to aromatic copolyamide polymers prepared from a mixture of p-phenylenediamine and N,N'-bis(4-aminophenyl)isophthalamide as aromatic diamines. 2. Description of Prior Art Aromatic polyamides having a high melting point and glass transition temperatures are characterized by the outstanding physiochemical and mechanical characteristics such as high thermostability, chemical resistance, and elasticity. Fibers prepared from the aromatic polyamides having the above characteristics can be used as high heat resistant fibers, reinforcing agents for rubbers, composite materials or the like. Particularly, fibers having ultrahigh tenacity and elasticity can be prepared using poly(p-phenyleneterephthalamide) as a polyamide or copolyamide with the molecular chain extended from both ends of the aromatic ring toward its parallel direction. As a representative example of such fiber consisting of poly(p-phenyleneterephthalamide), "Kevlar" is generally well known aramid fiber which is commercially available from E. I. Du Pont de Nemours and Company, Wilmington, Del., U.S.A. However, in spite of the above outstanding characteristics of the aramid fiber, this prior art process has been encountered with difficulties due to the significantly low solubility of p-phenyleneterephthalamide in the polymerization solvent.

A poly(p-phenyleneterephthalamide) must be dissolved in very limited kinds of polymerization solvents such as strong sulfuric acid or a mixture of hexamethylphosphoramide and N-methylpyrrolidone to which mixture LiCl is added. Practically, the strong sulfuric acid is only available as a solvent used in the process for the preparation of the spinning solution which forms lyotric liquid crystals. When this polyamide is applied to industries, a lot of troubles may occur from the use of the strong sulfuric acid, such as corrosion onto the installations, dangers in handling, difficulties in removing the remnant solution and complexity in dissolving polymers in the solvent. Especially, the fibrillation of the fibers due to the use of the sulfuric acid may cause fatal drawbacks in the conventional use of the fibers. The fibrillation into a number of individual fibrils is ascribed to the sudden deletion of the sulfuric acid between the molecular chains, at the time the coagulation occurs in the polymerization solution for the formation of the fibers. Thus, these severe drawbacks found in the aramid fiber are caused by the residual sulfuric acid in the fiber, and the fibrillation might result in the restriction of utility of the fiber as an reinforcing material for rubbers or cements.

To increase the solubility of the polyamides or copolyamides as described above, the molecular chains need to be linked at both ends of the aromatic rings. In this connection, it is known that the aromatic ring units are linked at the meta-position or the rotatable bond is introduced into the position between the aromatic rings. This results in the increase of the solubility of the copolyamide in the polymerization solvent.

The polymerization solution so prepared has a high polymerization degree and stable isotropic property which does not cause the phase separation, and gives fibers and films by directly spinning and casting. However, mechanical characteristics such as the elasticity of the fiber greatly decrease with the increase of the proportional ratio of m-phenylene of the formula:

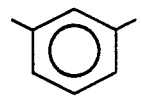

in the molecular chain. Likewise, in case of the films, the mechanical characteristics such as transparency also decrease. The deterioration of the mechanical characteristics caused by the procedures to improve the solubility of the copolyamide could not completely overcome even though a lot of efforts have been tried by inducing the modified units into the copolyamide with the molecular chain like rigid rod. Also, the polymerization solution of the copolyamide is so unstable that there are a lot of difficulties to form fibers or films. Therefore, it is too difficult to commercially prepare the copolyamide having high molecular weight.

However, these defects have been overcome by the use of another unit modified from p-methylene of the formula:

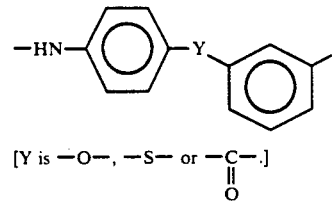

$[Y \text{ is } -O-, -S- \text{ or } -\underset{\underset{O}{\|}}{C}-.]$ and a third monomer, as described fully in U.S. Pat. No. 4,075,122. From this patent, it is noted that the fibers and films are prepared by directly spinning and casting, respectively, without the process for the preparation of the spinning solution forming lyotropic liquid crystal. The fiber prepared from the process mentioned above is known as "TECHNORA" commercially available from Teijin Limited, Osaka, Japan. On the other hand, this trial is only valuable in overcoming the defects of the mechanical characteristics. That is, 3,4'-diaminodiphenylether of the formula:

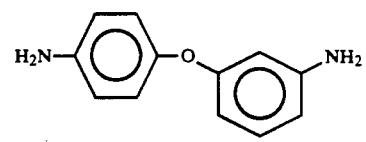

used as a third monomer in the process for the preparation of "TECHNORA" is significantly expensive in cost, resulting in economically disadvantage.

Accordingly, the object of the invention is to provide a wholly aromatic copolyamides as novel polymers.

Another object of the invention is to provide fibers and/or films having ultrahigh tenacity, elasticity and thermostability properties.

Yet another object of the invention is to provide a process for preparing a copolymerization solution having better stability and fluidity using a novel diamine monomer.

Still another object is to provide a process for preparing fibers and films by direct spinning and casting the copolymerization solution.

Other objects and advantages of the invention will become apparent from the following description of the invention.

SUMMARY OF THE INVENTION

The present invention does not provide a process for single polymers but copolymers by using the characteristics of the single polymers described in U.S. Pat. No. 4,511,709. According to the invention, the proportional ratio of the para-linkage and meta-linkage units of the polymers is adjusted by properly mixing N,N'-bis(4-aminophenyl)isophthalamide and p-phenylenediamine as a para-monomer used in the prior art. By the above procedure, the reciprocal distance between the meta-linkage units of the polymer is adjusted at the same time. The fibers and films prepared through the above procedure are characterized by maintaining a high polymerization degree.

In accordance with the invention, the polymerization solution is prepared by properly mixing N,N'-bis(4-aminophenyl)-isophthalamide as a diaminemonomer with p-phenylenediamine as a para-monomer having lower molecular weight, and copolymerizing the above mixture with terephthaloyl chloride as a diacid chloride. By adjusting the concentration and viscosity of the copolymerization solution, the fibers and films of the invention are spun and cast directly from the polymerization solution, respectively.

The fibers and films of the invention are characterized by the outstanding mechanical and thermal properties such as ultrahigh tenacity, thermostability, modulus and transparency. For example, the tensile strength for the films and fibers of the invention ranges from 100 to 150 kg/mm$^2$ and 10–14 g/den, respectively.

According to the invention, N,N'-bis(4-aminophenyl)-isophthalamide used as one of the monomers of the formula:

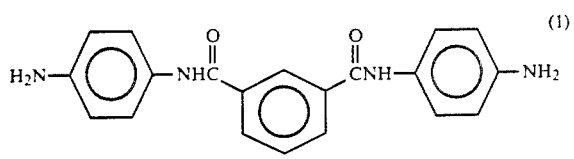

which is used as one of the monomers, may be prepared by the same process as in the preparation of N,N'-bis(4-aminophenyl)-terephthalamide of the formula:

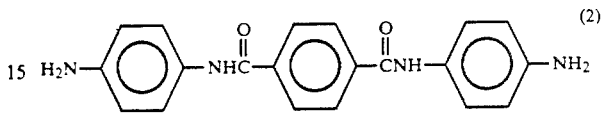

which is disclosed in Korean Patent 11,475. That is, as shown in Reaction A below, N,N'-bis(4-aminophenyl)isophthalamide is synthesized by condensing isophthaloyl chloride (formula 3 below) with 2 equimolar weight of p-nitroaniline (formula 4 below) under low temperatures, and subjecting the resultant intermediate to hydrogenation in the presence of a Raney nickel catalyst under high hydrogen pressure.

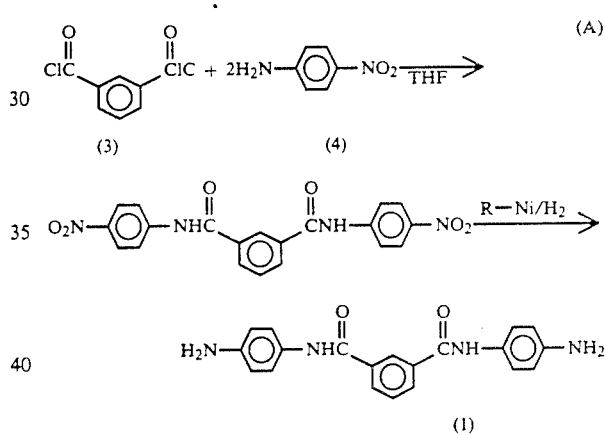

As outlined in Reaction B below, the copolyamide in accordance with the invention is prepared by reacting a mixture of a certain ratio of a diamine monomer (formula 1 below) and p-phenylene diamine (formula 5 below) with terephthaloyl chloride (formula 6 below).

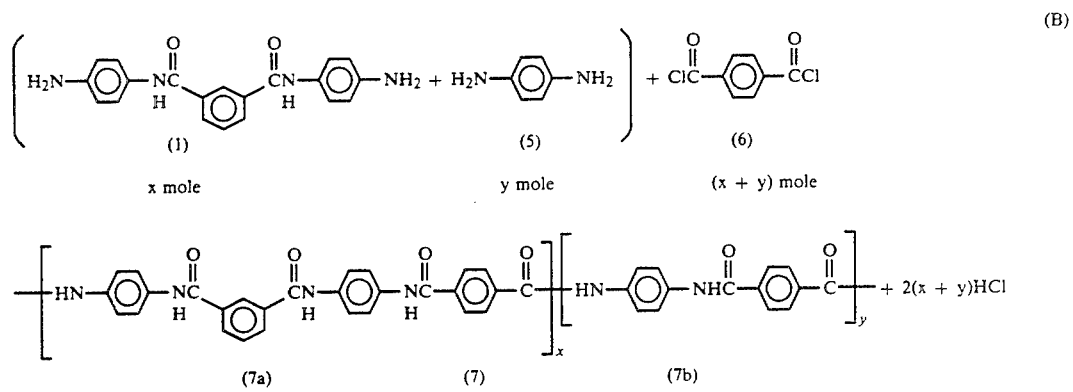

In order to obtain the polymers having the same fundamental structure as that of the copolyamides of the invention, it may be possible to react a mixture of isophthaloyl chloride (formula 3 above) in place of an N,N'-bis(4-aminophenyl)isophthalamide monomer and terephthaloyl chloride (formula 6 above) in a given proportion with p-phenylenediamine (formula 5 above) as shown in Reaction C below. However, it is quite possible to obtain a high polymerization degree of copolyamides when the monomers of the invention are used.

at least part of the above monomers and the resultant high molecular weight polymers at a temperature ranging from −20° C. to 100° C. should be used. If necessary, an acid acceptor can also be used for the same purpose. Halide salts of the metals of Groups I & II of the periodic table may be added to the organic solvent, to increase solubility of the polymer and improve the

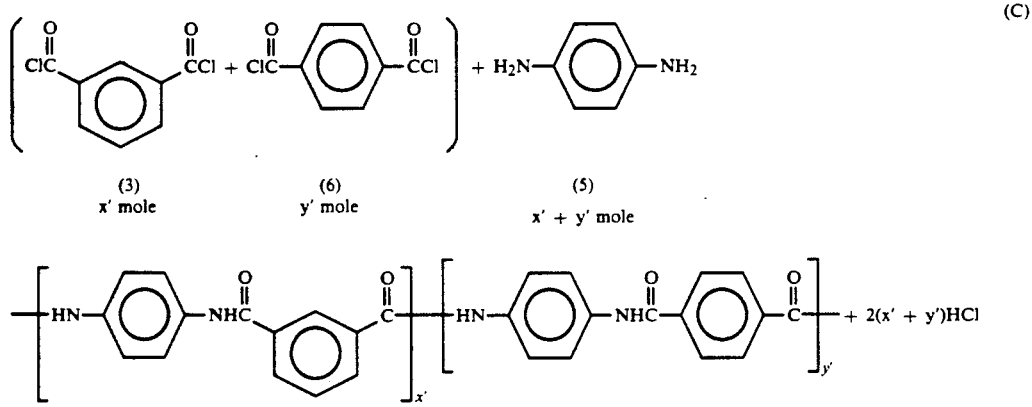

(C)

As described in U.S. Pat. No. 3,049,518, a high polymerization degree of copolyamides can be prepared by using an intermediate, N,N'-bis(4-aminophenyl)isophthalamide as a starting material (Reaction B), since a less amount (½ amount) of hydrogen chloride evolves as compared with Reaction C.

The reaction between a diamine monomer and diacid chloride results in sudden polycondensation of diamine monomers and evolution of HCl gas as depicted in Reactions B and C. This HCl must be expelled in order to manufacture a high polymerization degree of copolyamides. This can be attained by the use of the monomer of the invention. From the use of diamine monomer of the invention, the loss of crystallinity of the copolyamides can be prevented at maximum by increasing the reciprocal distance between meta-linkage units in the molecular chains of the polymer produced in accordance with the invention. The deterioration of the mechanical characteristics can also be prevented by the increase of the solubility resulted from the prevention of the loss of crystallinity of the copolyamides of the invention.

The copolyamides having high molecular weight according to the invention are basically composed of a mixture of the structural units (7a,7b) as shown in Reaction (B). The structural unit (7a) with respect to the total repetition units in the copolyamides of the invention should be introduced up to the range of 12-90%, especially the range of 12-30%, in order to maintain the desired solubility and mechanical tenacity concurrently.

As stated above, the copolyamides of the formula (7) are prepared by providing a mixture of N,N'-bis(4-aminophenyl)-isophthalamide so that the repeating units of (7a) of the whole molecular chains can be within appropriate ranges for the purpose of the invention, and subjecting the mixture to copolymerization. To this end, surface polymerization, melt polymerization, solid polymerization, liquid polymerization, etc. may be performed. Preferably, the liquid polymerization may be employed for obtaining the desired copdyamides of the invention.

In effecting the liquid polymerization to give the copolyamides, an organic solvent capable of dissolving stability of the formed polymerization solution. Suitable organic solvents may include amide solvents, for example, N,N'-dimethylacetamide, N-methylpyrrolidone, hexamethylphosphoramide, N-methylpiperidone, N,N,N',N'-tetramethylurea, N-caprolactam, N,N'-dimethylacetamide, N-ethylpyrrolidone, N-acetylpyrrolidone, and combinations of these solvents.

DETAILED DESCRIPTION OF THE INVENTION

In an optimal polymerization, 12-90 mole % of N,N'-bis(4-aminophenyl)isophthalamide and 88-10 mole % of p-phenylenediamine are admixed in such a manner that the combined molar fraction become 100%. The mixture is dissolved in an amide solvent, and 100 mole % of terephthaloylchloride is then added to the mixture while stirring. The reaction rate is adjusted with the change of the molar fraction of the diamine monomers added; thereby, the viscosity of the reaction mixture suddenly or slowly increases. However, the polymerization reaction is substantially terminated within 24 hrs. The above amide solvent may also serve as an acid acceptor. The reaction temperature preferably ranges from −20° C. to 100° C., most preferably −5° C. to 50° C.

The viscosity of the resulting polymerization solution and the polymerization degree of the polymer so produced, which are critical factors in preparing films/fibers, are determined depending on the concentration of the monomers added to the polymerization reaction system. The concentration of the monomers added, which determines the above degree and viscosity, varies slightly depending on the proportional ratios of the two monomers, the selected solvent, and the reaction temperature. Generally, the concentration of the monomers in a polymerization solution is maintained at preferably 4-20% by weight, most preferably 6-15% by weight. In the above polymerization, a solubility-improving agent such as LiCl and CaCl₂ may preferably be added to the polymerization system in the amounts of 1-5% by weight during or after the reaction. It may also be effective to add an acid acceptor or neutralizing agent such as pyridine, picoline, etc. to the system during, before, or after the reaction. As an original solution (e.g., spinning solution) for manufacturing a molded article, the polymerization solution of the copolyamide so prepared is directly used. After adding an excess of water to the polymerization solution, the resulting mixture is ground in a mixer while recovering the precipitated polymers. These polymers are then washed with water, dried, and redissolved in a suitable solvent to prepare an original polymerization solution However, it is noteworthy that the invention is to provide a process for the direct molding of the polymerization solution obtained from the liquid polymerization. Wholly aromatic copolyamides obtained according to the invention have excellent solubility and can result in the formation of fibers and/or films having outstanding mechanical characteristics.

The polymerization degree of the copolyamides of the invention may be expressed by an inherent viscosity (I.V.) in accordance with the following equation:

$$\eta_{inh} = \ln(\eta rel)/C$$

wherein ηrel represents relative viscosity; and C represent a concentration of 0.5 gram of polymer or fiber in 100 ml of the solvent expressed in terms of 0.5 g/dl. The relative viscosity ηrel is determined by dividing the flow time, in a capillary viscometer of a dilute solution of the polymer by the flow time of pure solvent. The dilute solution used herein for determining rel is of the concentration expressed by C above. The flow time is determined at 30° C., using concentrated sulfuric acid (97% $H_2SO_4$) as a solvent.

The polymerization degree in terms of inherent viscosity suitable for the purposes of the invention ranges from 1.0 to 6.0. Preferably, the polymers having an inherent viscosity of 2.0–5.0 are effective for preparing a moderate concentration of polymerization solution. Films and fibers from this solution can maintain excellent mechanical properties and heat-resistance.

The fibers are prepared by any of the dry-spinning, wet-spinning, and dry-jet wet spinning processes, using the polymerization solution directly as the original spinning solution. The dry-jet wet spinning process is most useful for the purposes of the invention. This process is described in U.S. Pat. No. 3,671,542 and illustrated below in detail. The spinning solution is kept at 15° C. to 90° C., preferably at room temperature to 70° C., and injected through the spinnerets (diameter: 0.1 mm, number of spinnerets: 12). The spinning solution so injected is subjected to tension while passing through the air space between the spinneret and a coagulation solution, and then immediately introduced into the coagulation solution. The resulting fibers are finally winded on a roll. Thus, the dry-jet wet spinning is significantly different from the conventional wet spinning, and characterized by the location of the air space between spinnerets and the coogulation solution. The fibers are tensioned in the air space owing to a difference in the injection and the winding rates.

The fibers so obtained, into which 12–18 moles of N,N'-bis-(4-aminophenyl)isophthalamide have been introduced, have a strength of 10–15 g/den and an elasticity of 100–400 g/den. In the cases of different molar fractions of the above copolymers, the strength and the elasticity are 4–13 g/den and 70–210 g/den, respectively.

The copolyamide fibers or films prepared by the process described above can be elongated to the high magnification, resulting in the fibers or films having the outstanding mechanical characteristics and thermostability. The elongation useful for the high performance fibers or films of the invention is from 1:1.3 to just prior to being cut, preferably 1:4 to 1:9 for high mechanical and thermal properties. The elongation is carried out within the ranges from the glass transition temperature to a temperature at which the brittleness does not rapidly occur, on a hot plate or cylindrical heating rod. The heat-elongation proceeds at temperatures ranging from 250° C. to 500° C., preferably from 300° C. to 450° C.

The differential thermal and the weight thermal analyses reveal that the copolyamide and the fiber or film prepared by the invention become suddenly decomposed at a temperature above 450° C. They are usefully used at a temperature up to 400° C. for a short period of time, and up to 250° C. for a long period of time. Also, they are useful as a variety of the industrial materials such as materials for reinforcing rubbers, resins, cements, etc., insulating materials, heat-resistant transparant films, and the like, attributing to their outstanding mechanical characteristics and thermostability.

The invention will further be illustrated by means of the following examples which are presented for illustrative purposes only.

EXAMPLE 1

Preparation of a polymer by reacting a 12.5:87.5 mixture of N,N'-bis(4-aminophenyl)isophthalamide and p-Phenylenediamine with terephthaloyl chloride N,N'-dimethylacetamide (240 ml, 2.58 mole), LiCl (7.2 g, 0.17 mole), N,N'-bis(4-aminophenyl)isophthalamide (2.595 g, 0.0075 mole), and p-penylenediamine (5.67 g, 0.0525 mole) were put into a 1 L four-way round bottom flask equipped with a stirrer, a thermometer, and a nitrogen inlet while stirring. The solution so obtained was maintained at 30° C. Pyridine (15.2 ml, 0.19 mole) was added to the solution. Terephthaloyl chloride (12.26 g, 0.06 mole) was added to the resultant mixture at once with vigorously agitating. The viscosity of the solution slowly increased in 10 minutes after the completion of the above addition. The mixture solution was stirred for 3 hrs. and maintained at room temperature for a day. The polymerization solution so prepared was very stable and did not undergo phase separation even though it was kept for even more than 30 days. It was quite possible to prepare films by the direct film-casting of the polymerization solution and fibers by the direct spinning of the same solution. In order to obtain solid polymer powder, the polymerization solution was added to an excess amount of water and pulverized in a mixer so that the polymer was precipitated in the form of powder. The polymer recovered was washed several times with water to completely remove the solvent, and dried for more than 6 hrs. in a vaccum drier at 80° C. The resulting polymer was a pale yellowish powder and its I.V. was 3.93.

EXAMPLE 2

Preparation of a polymer by reacting a 12.5:87.5 N,N'-bis(4-aminophenyl)isophthalamide and p-phenylenediamine with terephthaloyl chloride.

This shows an example where N-methylpyrrolidone was used as a polymerization solvent. N-methylpyrrolidone (240 ml, 2.49 mole), LiCl (9.6 g, 0.23 mole), N,N'- bis(4-aminophenyl)isophthalamide (2.595 g, 0.0075 mole) and p-phenylenediamine (5.67 g, 0.0525 mole) were placed into a 1 L four-way round bottom flask while stirring. The resultant solution was maintained at 25° C. Thereafter, pyridine (13.7 ml, 0.17 mole) was added to the mixture. Then, terephthaloyl chloride (12.26 g, 0.17 mole) was added thereto at once followed by vigorously stirring. The viscosity of the resultant solution slowly increased after 10 minutes of the addition.

The mixture solution was stirred for 3 hrs. and maintained at room temperature for a day. The polymerization solution so prepared was very stable and did not undergo phase separation even though it was kept for even more than 30 days. It was possible to prepare films by the direct film-casting of the polymerization solution and fibers by the direct spinning of the same solution. In order to obtain solid polymer powder, the polymerization solution was added to excess amount of water and pulverized in a mixer so that the polymer was precipitated in the form of powder. The polymer recovered was washed several times with water to completely remove the solvent, and dried for more than 6 hrs. in a vaccum drier at 80° C. The resulting polymer was a pale yellowish powder and its I.V. was 3.44.

EXAMPLE 3

Preparation of a polymer by reacting a 12.5:87.5 mixture of N,N'-bis(4-aminophenyl)isophthalamide and p-phenylenediamine with terephthaloyl chloride.

This shows an example where calcium chloride was used as an alkali metal salt.

N,N'-dimethylacetamide (240 ml, 2.58 mole), $CaCl_2$ (6.2 g, 0.06 mole), N,N'-bis(4-aminophenyl)isophthalamide (2.595 g, 0.0075 mole), and p-penylenediamine (2.595 g, 0.0075 mole) were put into a 1 L four-way round bottom flask equipped with a stirrer, a thermometer, and a nitrogen inlet while stirring. The solution so obtained was maintained at 30° C. Pyridine (10.4 ml, 0.13 mole) was added to the solution. Terephthaloyl chloride (12.26 g, 0.06 mole) was added to the resultant mixture at once with vigorously agitating. The viscosity of the solution slowly increased in 10 minutes after the completion of the above addition. After an hour, no change in viscosity was found. The mixture solution was stirred for 3 hrs. and maintained at room temperature for a day. The polymerization solution so prepared was very stable and did not undergo phase separation even though it was kept for even more than 30 days. It was quite possible to prepare films by the direct film-casting of the polymerization solution and fibers by the direct spinning of the same solution. In order to obtain solid polymer powder, the polymerization solution was added to an excess amount of water and pulverized in a mixer so that the polymer was precipitated in the form of powder. The polymer recovered was washed several times with water to completely remove the solvent, and dried for more than 6 hrs. in a vaccum drier at 80° C. The resulting polymer was a pale yellowish powder and its I.V. was 3.60.

EXAMPLE 4

Preparation of a polymer by reacting a 12.5:87.5 mixture of N,N'-bis(4-aminophenyl)isophthalamide and p-phenylenediamine with terephthaloyl chloride.

This shows an example where a 1:2 (v/v) mixture of hexamethylphosphoramide and N-methylpyrrolidone was used as a polymerization solvent. Hexamethylphosphoramide (86 ml, 0.46 mole), N-methylpyrrolidone (160 ml, 0.17 mole), LiCl (6.9 g, 0.14 mole), N,N'-bis(4-aminophenyl)isophthalamide (2.595 g, 0.0075 mole) and p-phenylenediamine (5.67 g, 0.0525 mole) were placed into a 1 L four-way round bottom flask while stirring. The resultant solution was maintained at 25° C. Thereafter, pyridine (22.8 ml, 0.28 mole) was added to the mixture. Then, terephthaloyl chloride (12.26 g, 0.06 mole) was added thereto at once followed by vigorously stirring. The viscosity of the resultant solution slowly increased after 10 minutes of the addition. After an hour, no change in the viscosity was observed. The mixture solution was stirred for 3 hrs. and maintained at room temperature for a day. The polymerization solution so prepared was very stable and did not undergo phase separation even though it was kept for even more than 30 days. It was quite possible to prepare films by the direct film-casting of the polymerization solution and fibers by the direct spinning of the same solution. In order to obtain solid polymer powder, the polymerization solution was added to an excess amount of water and pulverized in a mixer so that the polymer was precipitated in the form of powder. The polymer recovered was washed several times with water to completely remove the solvent, and dried for more than 6 hrs. in a vaccum drier at 80° C. The resulting polymer was a pale yellowish powder and its I.V. was 3.08.

EXAMPLE 5

Preparation of a copolyamide fiber from a mixture of N,N'-bis(4-aminophenyl)isophthalamide (12.5)/p-phenylenediamine (87.5)/terephthaloylchloride (100).

10 Grams of the polymerization solution (I.V. = 3.93) obtained from Example 1 were placed into a 500 ml one-necked round bottom flask and concentrated under reduced pressure to remove the solvent until the polymerization solution reached a 18% concentration. The polymerization solution (original spinning solution) adjusted to a proper concentration was transferred into a spinning machine and air was removed off therefrom by subjecting the system under reduced pressure for 30 minutes. After maintaining the temperature at 30° C., the solution was filtered through a 400 mesh filter. The filtered spinning solution was injected through the spinnerets (diameter: 0.4 mm, number of spinnerets: 12) at a linear rate of 15 m/min. The injected spinning solution was subjected to tension at a 4-folds tension rate between the air spaces (2 cm) defined. Then, the solution was coagulated in a coagulation solution to form fibers and winded around a winding roller at a rate of 60 m/min. The fibers so prepared were dried after being impregnated for more than a day to remove the residual alkali metal salts therefrom. The dried fibers were subjected to heat-elongation at the ratio of 1:6 within 10 seconds on a heat plate at a surface temperature of 300° C. The desired fibers were found to be characterized by having a density of 3.3 den., a strength of 13.2 g/den., an elongation of 7%, and an elasticity of 275 g/den.

EXAMPLE 6

Preparation of a polymer by reacting a mixture of different ratios of N,N'-bis(4-aminophenyl)isophthalamide and p-phenylene-diamine.

All the procedures described in Example 1 were repeated using N,N'-dimethylacetamide (240 ml, 2.58 mole) as a polymerization solvent, lithium chloride (7.2 g, 0.17 mole) as an alkali metal salt and pyridine (15.2 ml, 0.19 mole) as an acid acceptor, except that N,N'- bis(4-aminophenyl)isophthalamide and p-phenylenediamine were admixed with each other so that the total amounts of these two amines can be 0.06 mole, and then reacted with terephthaloyl chloride (12.26 g, 0.06 mole). The preparation of the copolyamides in accordance with the changes in the repeating units is shown in Table 1.

TABLE 1

| Ex. | Ratio | Diamine Monomer BAiP[1] g (mole) | PPD[2] g (mole) | Terephthaloyl Chloride g (mole) | Inherent Viscosity of Copolyamides Produced (I.V.) |
|---|---|---|---|---|---|
| 6-1 | 20/80 | 4.152 (0.012) | 5.18 (0.048) | 12.26 (0.06) | 2.93 |
| 6-2 | 30/70 | 6.228 (0.018) | 4.54 (0.042) | 12.26 (0.06) | 2.48 |
| 6-3 | 40/60 | 8.304 (0.024) | 3.89 (0.036) | 12.26 (0.06) | 2.57 |
| 6-4 | 50/50 | 10.38 (0.03) | 3.24 (0.03) | 12.26 (0.06) | 2.41 |
| 6-5 | 60/40 | 12.46 (0.036) | 2.59 (0.024) | 12.26 (0.06) | 2.32 |
| 6-6 | 70/30 | 14.53 (0.042) | 1.94 (0.018) | 12.26 (0.06) | 2.2 |
| 6-7 | 80/20 | 16.61 (0.048) | 1.30 (0.012) | 12.26 (0.06) | 1.93 |
| 6-8 | 90/10 | 18.68 (0.054) | 0.65 (0.006) | 12.26 (0.06) | 1.84 |

[1]BAiP = N,N'-bis(4-aminophenyl)isophthalamide
[2]PPD = p-phenylenediamine

EXAMPLE 7

Preparation of the fibers consisting of copolyamides of different ratios of diamines.

The procedures described in Example 5 were repeated, except for using copolyamides obtained from a mixture of N,N'-bis(4-aminophenyl)isophthalamide and p-phenylenediamine, the relative ratios of amines being changeable within the ranges from 20/80 to 90/10 as illustrated in Table 2.

TABLE 2

| Ex. | Copolymer Ratio of two diamines BaiP/PPD | Inherent Viscosity (inh) | Spinning conditions Concentration of solution (%) | Ratio of Tensile Strength | Fiber T[1] (g/d) | E[2] (%) | M[3] (g/d) | D[4] (den) |
|---|---|---|---|---|---|---|---|---|
| 7-1 | 20/80 | 2.93 | 18.2 | 3.6 | 12.2 | 8.0 | 203 | |
| 7-2 | 30/70 | 2.48 | 18.8 | 3.0 | 10.4 | 8.0 | 188 | |
| 7-3 | 40/60 | 2.57 | 18.0 | 3.2 | 11.3 | 7.6 | 162 | |
| 7-4 | 50/50 | 2.41 | 18.8 | 3.6 | 8.4 | 8.4 | 140 | |
| 7-5 | 60/40 | 2.32 | 20.2 | 3.2 | 8.0 | 9.6 | 117 | |
| 7-6 | 70/30 | 2.20 | 18.8 | 3.0 | 6.7 | 10.4 | 90 | |
| 7-7 | 80/20 | 1.93 | 20.4 | 4.0 | 6.3 | 10.4 | 92 | |
| 7-8 | 90/10 | 1.84 | 20.8 | 4.2 | 6.7 | 10.8 | 87 | 3.3 |

[1]T = Tenacity
[2]E = Elasticity
[3]M = Modulus
[4]D = Density

What is claimed is:

1. A wholly aromatic copolyamide polymer consisting essentially of recurring units of the formula:

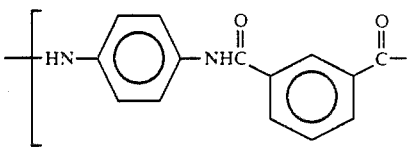

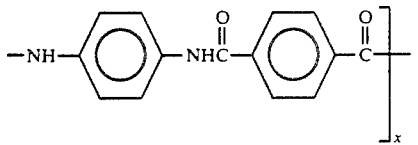

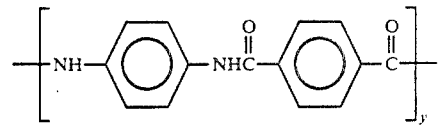

wherein x and y each represent the molar fraction of N,N'-bis(4-aminophenyl)isophthalamide and the molar fraction of p-phenylenediamine; provided that x is 0.12 to 0.9 and y is 0.88 to 0.1.

2. A process for the preparation of a wholly aromatic copolyamide polymer consisting essentially of recurring units of the formula:

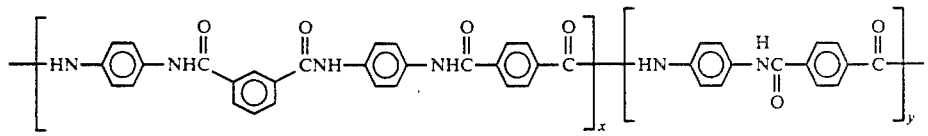

wherein x represents the molar fraction of N,N'-bis(4-aminophenyl)isophthalamide and is 0.12 to 0.9 and y represents the molar fraction of p-phenylenediamine and is 0.88 to 0.1, which process comprises:

dissolving an alkali metal salt and a tertiary amine as an acid acceptor in a tertiary amide solvent;

adding thereto a mixture of N,N'-bis(4-aminophenyl)isophthalamide of the formula:

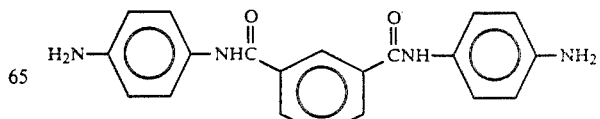

and p-phenylenediamine in a given proportion;
adding terephthaloyl chloride to said mixture, and copolymerizing said mixture at low temperatures.

3. The process as defined in claim 2, wherein said proportion ranges from 12:88 to 90:10.

4. The process as defined in any of claims 2 or 3, wherein said proportion ranges from 12:88 to 70:30.

5. The process as defined in claim 2, wherein said amide solvent is selected from the group consisting of N,N'-dimethyl-acetamide, N-methylpyrrolidone, hexamethylphosphoramide, N-methylpiperidone, N,N,N',N'-tetramethylurea, N-caprolactam, N,N'-dimethylacetamide, N-ethylpyrrolidone, N-acetylpyrrolidone, and combinations thereof.

6. The process as defined in claim 2, wherein said alkali metal salt is selected from the group consisting of LiCl and CaCl$_2$.

7. The process as defined in any of claims 2 or 6, wherein said alkali metal salt is added in the amount of 1% to 5% by weight.

8. The process as defined in claim 2, wherein said amine is selected from the group consisting of pyridine, picoline, and quinoline.

9. The process as defined in any of claims 2 or 8, wherein said amine is supplied in the amount of 1% to 5% by weight.

10. A fiber or film of the wholly aromatic copolyamide of claim 1.

* * * * *